July 14, 1953     C. R. BOWLAND     2,645,706
COMBINED MIRROR AND FLASHLIGHT
Filed Sept. 27, 1948
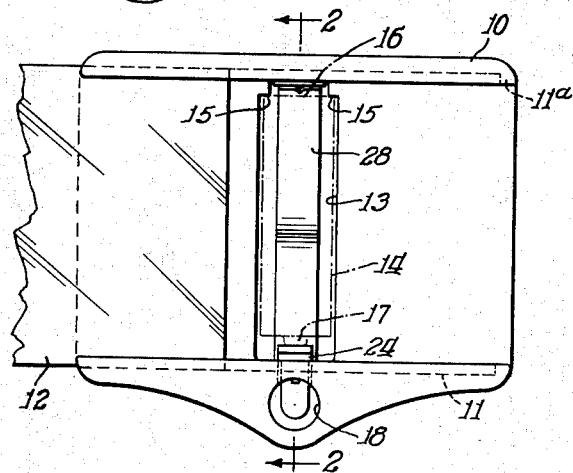
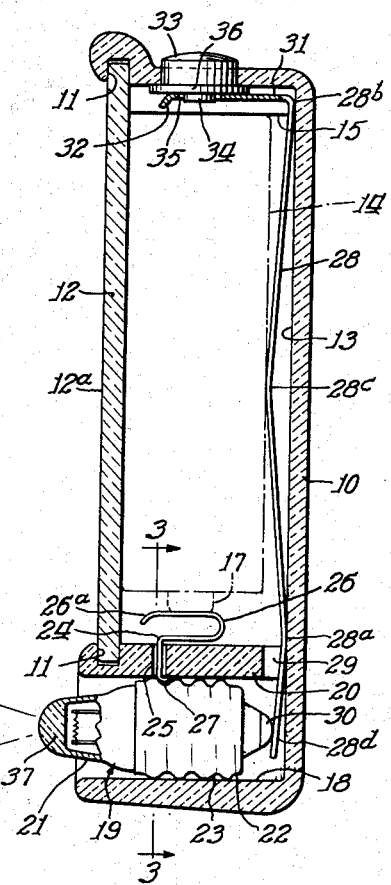
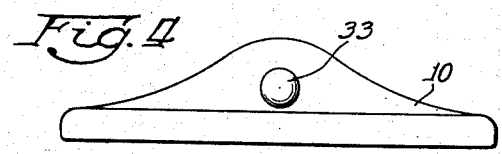
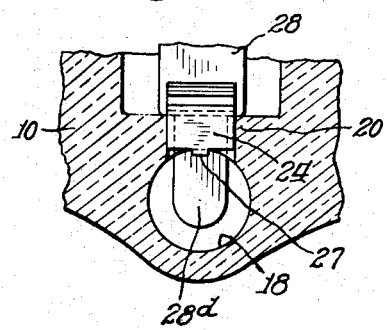
Inventor:
Charles R. Bowland
By: Keith J. Blewe
Atty.

Patented July 14, 1953

2,645,706

UNITED STATES PATENT OFFICE 2,645,706

COMBINED MIRROR AND FLASHLIGHT

Charles R. Bowland, Spring Valley, Ill.

Application September 27, 1948, Serial No. 51,369

2 Claims. (Cl. 240—4.2)

My invention relates to mirrors particularly adapted to be carried in handbags.

Ordinary handbag mirrors are quite useless in the dark. It is an object of the present invention to provide an improved handbag mirror having a flashlight in conjunction with it so that the user may light up the object or part of himself, such as his face, with which the mirror is to be used.

It is a further object to provide such a combination mirror and flashlight which has an electric bulb that throws a narrow, acute angled beam so that a person may light up his lips, for example, without throwing light into his eyes. It is another object of the invention to dispose the light and the button for controlling the circuit through the light on opposite sides of the mirror for easy manipulation.

It is also an object to provide such a combination mirror and flashlight that may be economically manufactured, and in this connection it is an object to provide the mirror with a case having a slot for receiving the mirror, to dispose the battery for the light back of the mirror and to provide a spring means for forcing the battery against the mirror whereby the battery frictionally holds the mirror from sliding out of the slot. It is contemplated that the spring means shall preferably be an electric conducting strip in the circuit for the light and that that strip shall also have the function of holding the button for controlling the lighting of the electric bulb yieldingly in a circuit breaking position.

It is another object to provide improved means for holding the electric bulb in an appropriate recess in the casing. The electric bulb of the type contemplated has a circumferential groove provided in a tubular conductor portion, and it is a more specific object to provide an electric conductor in the circuit that bears on the tubular portion and is in the groove for thereby holding the bulb yieldingly in the recess. It is contemplated that the conductor shall preferably be of spring metal and the battery shall bear against to provide the necessary bearing force of the conductor in the groove.

The invention consists of the novel constructions, arrangements and devices to be hereinafter described and claimed for carrying out the above stated objects and such other objects as will appear from the following description of a preferred embodiment of the invention illustrated with reference to the accompanying drawing, wherein:

Fig. 1 is a front view of a handbag mirror embodying the principles of the invention;

Fig. 2 is a sectional view on an enlarged scale taken on line 2—2 of Fig. 1;

Fig. 3 is a fragmentary sectional view taken on line 3—3 of Fig. 2; and

Fig. 4 is a top view of the handbag mirror on the same scale as Fig. 1.

Like characters of reference designate like parts in the several views.

Referring now to the drawing, the illustrated handbag mirror may be seen to comprise a casing 10 having internal slots 11 provided therein. The casing may be of any suitable material, such as a plastic. A mirror 12 is provided in the slots, and the arrangement is such that the mirror may be moved through the slots from one side. The slots 11 have ends 11a which prevent movement of the mirror from one side of the casing 10. The front side 12a of the mirror is outward with respect to the casing 10 so that a person holding the handbag mirror may see his reflection.

The casing 10 is formed with a recess 13, and a battery 14 is provided in the recess. A pair of end abutment portions 15 are provided in the recess 13 against which the base end 16 of the battery bears. The battery is provided with the usual center terminal 17 at its opposite end as shown.

The casing 10 is provided with a cylindrical recess 18 for an electric light bulb 19, and a partition 20 separates the recess 13 from the recess 18, as is seen particularly in Fig. 2. The recess 18 as may be seen from Fig. 1 is disposed adjacent the long side of the mirror which is oblong in shape, and the glass part 21 of the bulb extends outwardly of the recess 18 so that light from the bulb is directed at objects in front of the mirror 12.

The bulb 19 is provided with the usual tubular terminal 22 which is provided with a circumferential threaded groove 23 therein. A contact 24 of spring metal extends loosely through an aperture 25 in the partition 20 and into the groove 23. The contact 24 is provided with a return bent portion 26, and the battery 14 bears on this portion with its terminal 17. When the mirror 12 is out of the casing 10, the battery may be slid into place in the casing, and a bent end 26a on the contact 24 facilitates movement of the terminal 17 over the contact in such operation. With the bulb 19 in place, the contact 24 is slightly flexed in its portion 26, and the contact is thus in spring contact with the bulb terminal 22 and the battery terminal 17. The lower end of the contact 24 is in the groove 23 in the bulb terminal 22, and the bulb is thus held in the recess 18 without the use of any threads in the plastic case 10. The contact 24 has a flange 27 on its lower end adapted to contact the partition 20 for holding the contact 24 from falling out of the aperture 25 when the battery 14 is removed from the casing 10.

A conductor 28 of strip spring metal is provided extending along the inner side of the recess 13. The conductor extends through an aperture 29 in the partition and into contact with the usual end terminal 30 of the bulb 22. The conductor 28, as will be noted from Fig. 2, contacts the recess 13 at its points 28a and 28b and is bent inwardly between these points to contact the battery at its point 28c and is bent inwardly at its lower end to contact the terminal 30 at its point 28d. The strip 28 thus bears with spring pressure on the battery 14 and also on the terminal 30 of the bulb 22. The strip 28 in bearing on the battery 14 functions to frictionally hold the mirror 12 in the casing 10, since it causes the battery to frictionally bear on the back of the mirror, and therefore some force must be used in sliding the mirror out of the slots 11 in removing the mirror.

The conductor 28 is provided with a portion 31 extending generally at right angles to the rest of the conductor and over the base end 16 of the battery, and a small flange 32 is provided on the end of the strip which is adapted to contact the base end of the battery.

A push button 33 is provided extending through the casing 10 into the recess 13. The button is provided with a small tip 34 which extends through an aperture 35 in the conductor strip 28, and the button is provided with an enlarged portion 36 which bears on the inside surface of the casing 10 and against which the strip portion 31 rests. The strip 28 is initially so formed that when assembled in the casing as shown it bears against the button 33 and holds it yieldably in its illustrated position, and in this position of the button and in the corresponding position of the strip portion 31, the flange 32 is out of contact with the base end 16 of the battery 14.

The lamp 19 used in the flashlight is preferably one that throws a narrow, acutely angled beam of light, and the glass bulb 21 of the lamp may be formed with a convex lens portion 37 for so directing the light. One type of lamp I have found particularly adapted to the illustrated embodiment of the invention is one that throws a beam of light with approximately a spread of 25 degrees.

The illustrated mirror and flashlight combination is intended particularly to be of a size suitable so that it can be carried in a ladies handbag, and the item may be used for illuminating and seeing a part of a person's face, for example, and in particular, the lips, as for applying a lipstick. The lamp 19 is at one side of the mirror, and if the invention is held in the position in which it is illustrated in Fig. 1, namely with the lamp at the lower edge, a person's lips may be illuminated and seen through the mirror, with the mirror held quite close to the face, without the narrow directed beam from the lamp shining into the person's eyes.

The button 33 which is adapted to be manually operated to complete a circuit between the lamp 19 and the battery 14 is located at the opposite side of the casing with respect to the lamp 19, and the button is thus in a handy position to be operated by a person holding the item to illuminate any part of his face.

The button 33 completes the circuit from the battery to the lamp 22 by bringing the flange 32 into contact with the base terminal 16 of the battery 14. The circuit then exists from the battery terminal 17, through the spring contact 24, the lamp terminal 22, the lamp itself, the lamp terminal 30, the strip conductor 28 and the flange 32 of the conductor 28 to the base terminal 16 of the battery 14.

The construction of the flashlight and mirror combination is advantageously such that it consists of a minimum number of parts, and it may be easily assembled. The spring contact 24 is such as to hold the terminals 17 and 22 in good electrical contact with itself due to its being made out of spring metal, and the contact is so constructed that it cannot fall out of the casing due to its flange 27 when the flashlight is disassembled. Since the contact 24 extends into the groove 23, no corresponding groove in the casing 10 for the threaded lamp terminal 22 need be provided. The conductor strip 28 not only functions to provide a portion of the electric circuit for the lamp 19, but it also functions to yieldingly hold the mirror 12 in place. The strip 28 as a further additional function holds the manually operated button 33 yieldingly in its circuit breaking position.

I wish it to be understood that I do not intend to limit my invention to the specific constructions and arrangements shown and described, except only insofar as the claims may be so limited, as it will be apparent to those skilled in the art that changes may be made without departing from the principles of the invention.

I claim:

1. In a flashlight, the combination of a hollow casing having a pair of slots formed therein, a mirror closing said casing and disposed in said slots and slidable in the slots to open the casing, an electric light bulb fixed in said casing and disposed so that light from the bulb is directed on objects in front of the mirror, a battery in said casing behind said mirror, and electrical conductor means completing an electric circuit including said battery and bulb for lighting the bulb, said conductor means comprising a spring conductor strip in spring pressed relationship between the inner surface of said casing and said battery to maintain the battery in frictional contact with said mirror to yieldably hold the mirror from sliding out of said slots, said strip extending longitudinally of said battery and contacting a terminal of said bulb at one end of the strip and having its other end movable into contact with a terminal of said battery against the spring action of the strip to complete the electric circuit.

2. In a flashlight, the combination of a hollow casing having a pair of slots formed therein, a mirror closing said casing and disposed in said slots and slidably in the slots to open the casing, an electric light bulb fixed in said casing and disposed so that light from the bulb is directed on objects in front of the mirror, a battery in said casing behind said mirror, electrical conductor means completing an electric circuit including said battery and bulb for lighting the bulb, said conductor means comprising a spring conductor strip in spring pressed relationship between the inner surface of said casing and said battery to maintain the battery in frictional contact with said mirror to yieldably hold the mirror from sliding out of said slots, said strip extending longitudinally of said battery and contacting a terminal of said bulb at one end of the strip, a manually operated button movably disposed in an opening in said casing, and a contact connecting one terminal of said battery and the other terminal of said bulb, said strip having its other end movable into contact with the other terminal of said battery by manual movement of said button against the spring action of the strip to complete the electric circuit and yieldably holding the button in its circuit breaking position.

CHARLES R. BOWLAND.

References Cited in the file of this patent

UNITED STATES PATENTS

| Number | Name | Date |
|---|---|---|
| 1,321,026 | Freed | Nov. 4, 1919 |
| 1,426,228 | Sloane | Aug. 15, 1922 |
| 1,940,023 | Schulte | Dec. 19, 1933 |
| 2,007,101 | Vonderembse | July 2, 1935 |
| 2,120,238 | Brush | June 14, 1938 |
| 2,224,259 | Florman | Dec. 10, 1940 |
| 2,225,936 | Williams | Dec. 24, 1940 |
| 2,235,109 | Morey | Mar. 18, 1941 |
| 2,239,599 | Florman | Apr. 22, 1941 |
| 2,262,040 | Pell | Nov. 11, 1941 |
| 2,276,370 | Conrad | Mar. 17, 1942 |
| 2,386,255 | Morey | Oct. 9, 1945 |
| 2,502,105 | Segal | Mar. 28, 1950 |

FOREIGN PATENTS

| Number | Country | Date |
|---|---|---|
| 377,136 | England | July 21, 1932 |
| 536,657 | England | May 22, 1941 |
| 576,898 | France | May 23, 1924 |